United States Patent

Yamamoto et al.

(10) Patent No.: US 9,765,878 B2
(45) Date of Patent: Sep. 19, 2017

(54) SHIFT DEVICE

(71) Applicant: KABUSHIKI KAISHA TOKAI RIKA DENKI SEISAKUSHO, Aichi (JP)

(72) Inventors: Makoto Yamamoto, Aichi (JP); Katsushi Miwa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 13/932,184

(22) Filed: Jul. 1, 2013

(65) Prior Publication Data

US 2014/0013889 A1 Jan. 16, 2014

(30) Foreign Application Priority Data

Jul. 11, 2012 (JP) .................. 2012-155647

(51) Int. Cl.
| B60K 20/00 | (2006.01) |
| F16H 59/10 | (2006.01) |
| F16H 59/08 | (2006.01) |
| F16H 61/24 | (2006.01) |
| F16H 59/02 | (2006.01) |

(52) U.S. Cl.
CPC ............ *F16H 59/10* (2013.01); *F16H 59/08* (2013.01); *F16H 2059/0295* (2013.01); *F16H 2061/242* (2013.01); *Y10T 74/2014* (2015.01)

(58) Field of Classification Search
CPC .......... F16H 59/10; F16H 59/02; F16H 59/08; F16H 59/04; F16H 59/0208
USPC .................. 74/473.3, 473.21, 473.32, 473.33
See application file for complete search history.

(56) References Cited

U.S. PATENT DOCUMENTS

| 6,904,822 B2 | 6/2005 | Meyer et al. |
| 7,694,604 B2 * | 4/2010 | Sickart ............... F16H 59/0204 74/473.12 |
| 7,966,905 B2 * | 6/2011 | Komatsu ................ F16H 59/10 74/473.21 |
| 8,613,236 B2 * | 12/2013 | Ito ......................... F16H 59/105 74/473.1 |
| 8,726,755 B2 * | 5/2014 | Nakamura ............. F16H 61/22 74/473.1 |

(Continued)

FOREIGN PATENT DOCUMENTS

| CN | 101173709 | 5/2008 |
| DE | 10 2005 048 875 | 4/2007 |

(Continued)

OTHER PUBLICATIONS

Office Action issued in Japan Counterpart Patent Appl. No. 2012-155647, dated Nov. 24, 2015, along with an English translation thereof.

(Continued)

*Primary Examiner* — Zakaria Elahmadi
(74) *Attorney, Agent, or Firm* — Greenblum & Bernstein, P.L.C.

(57) ABSTRACT

A shift lever is movable from a home position in a left or rear direction. A reverse mode selection position is set in a route extending in the left direction from the home position. A drive mode selection position is set in a route extending in the rear direction from the home position.

10 Claims, 3 Drawing Sheets

(56) References Cited

U.S. PATENT DOCUMENTS

| | | | | |
|---|---|---|---|---|
| 2001/0037700 | A1* | 11/2001 | Nishimura | F16H 59/10 74/473.3 |
| 2002/0011128 | A1* | 1/2002 | Syamoto | B60R 25/063 74/473.3 |
| 2002/0056334 | A1* | 5/2002 | Fujinuma | F16H 59/0204 74/473.1 |
| 2003/0106387 | A1* | 6/2003 | Lee | B60R 25/066 74/473.21 |
| 2004/0000209 | A1* | 1/2004 | Nagasawa | B60K 20/08 74/473.3 |
| 2004/0025613 | A1* | 2/2004 | Meyer | F16H 59/0204 74/335 |
| 2005/0056109 | A1* | 3/2005 | Kim | F16H 59/0204 74/473.3 |
| 2005/0087033 | A1* | 4/2005 | Chi | F16H 59/02 74/473.33 |
| 2005/0126326 | A1* | 6/2005 | Onodera | F16H 59/0204 74/473.18 |
| 2005/0193853 | A1* | 9/2005 | Zelman | B60K 20/02 74/473.18 |
| 2008/0108480 | A1 | 5/2008 | Kamada et al. | |
| 2008/0216594 | A1* | 9/2008 | Strait | F16H 59/0204 74/473.12 |
| 2009/0038426 | A1* | 2/2009 | Buttolo | F16H 61/24 74/473.3 |
| 2011/0130910 | A1 | 6/2011 | Kanai et al. | |
| 2011/0160969 | A1* | 6/2011 | Oguri | F16H 61/66259 701/52 |
| 2011/0174106 | A1* | 7/2011 | Ito | F16H 59/105 74/473.3 |
| 2011/0239802 | A1* | 10/2011 | Kino | B60K 20/08 74/473.3 |
| 2011/0257852 | A1* | 10/2011 | Ishino | F16H 59/105 701/51 |
| 2012/0016559 | A1 | 1/2012 | Ueno et al. | |
| 2012/0017715 | A1* | 1/2012 | Bugeja | F16H 63/42 74/473.3 |

FOREIGN PATENT DOCUMENTS

| | | |
|---|---|---|
| DE | 10 2006 008 816 | 8/2007 |
| EP | 2 378 164 | 10/2001 |
| GB | 2417994 | 3/2006 |
| JP | 9-329230 | 12/1997 |
| JP | 4009405 | 9/2007 |
| JP | 2008-115944 | 5/2008 |
| JP | 4373212 | 9/2009 |
| JP | 2010-18211 | 1/2010 |
| JP | 4500327 | 4/2010 |
| JP | 2011-219002 | 11/2011 |
| JP | 2012-56425 | 3/2012 |
| JP | 2012-071646 | 4/2012 |
| WO | 03/031845 | 4/2003 |

OTHER PUBLICATIONS

Extended European Search Report received in Appl. No. 13175240.4, dated Jan. 7, 2016.
China Foreign Official Action received in Appl. No. 201310282416.2, dated Jun. 1, 2016.
Japan Foreign Official Action received in Appl. No. 2012-155647, dated Jun. 7, 2016.
U.S. Appl. No. 13/952,944 to Makoto Yamamoto et al., filed Jul. 29, 2013.
Office Action issued in Japan Counterpart Patent Appl. No. 2016-174424, dated Apr. 25, 2017, along with an english translation thereof.

* cited by examiner

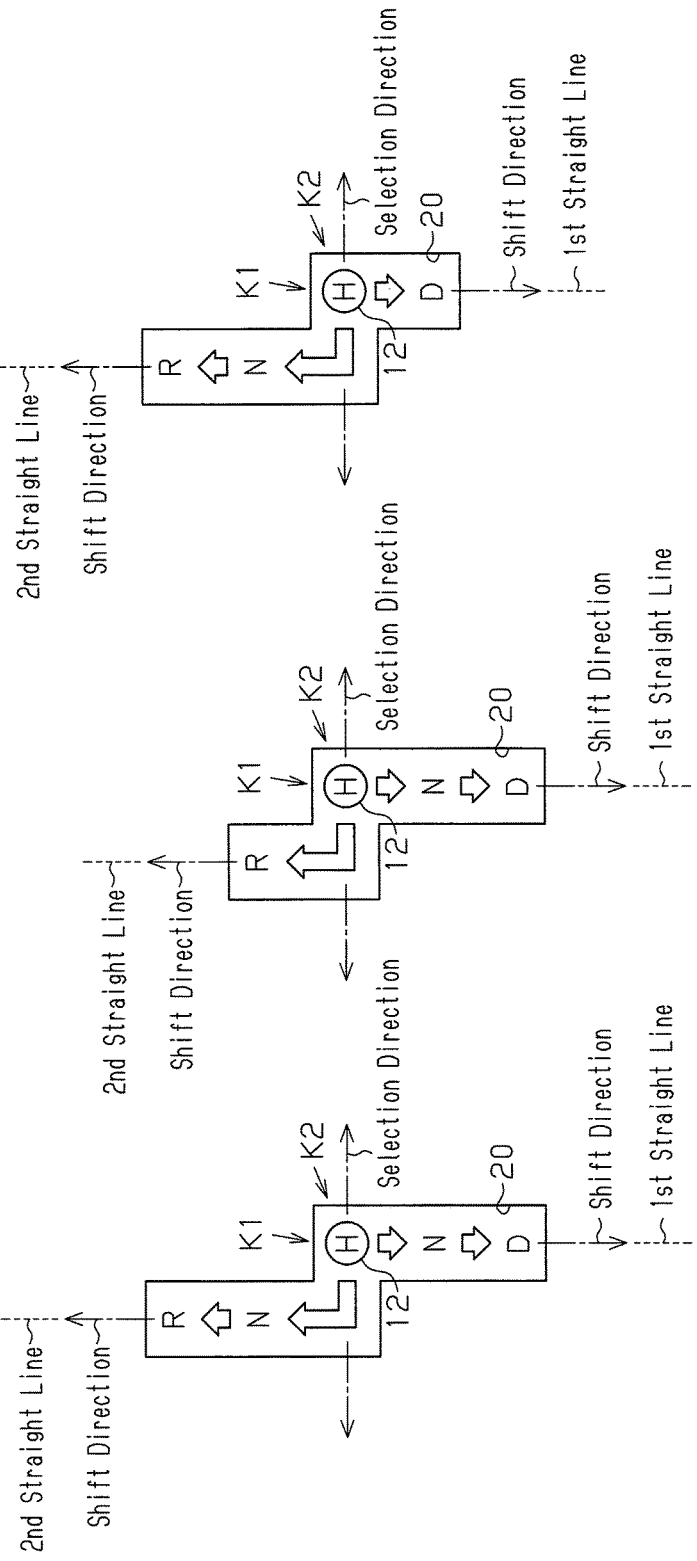

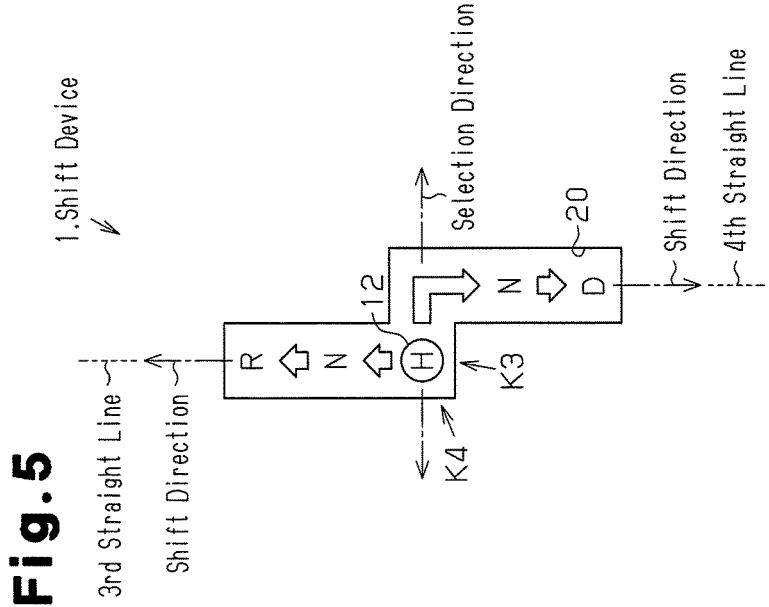

SHIFT DEVICE

CROSS-REFERENCE TO RELATED APPLICATIONS

This application is based upon and claims the benefit of priority from prior Japanese Patent Application No. 2012-155647, filed on Jul. 11, 2012, the entire contents of which are incorporated herein by reference.

BACKGROUND ART

The present invention relates to a shift device for selecting modes of a transmission.

A shift-by-wire shift device includes a position sensor that detects the movement of a shift lever and outputs a detection signal. Modes of a transmission, such as a drive mode, a reverse mode and the like, is switched in accordance with the detection signal of the position sensor. If the shift lever of the shift device is of a momentary type, the shift lever automatically returns to a home (H) position when released after being operated.

Japanese Patent No. 4373212 describes a momentary type shift device. In one example, the gearshift device includes a shift lever that is movable along a first route, which extends from the H position to a reverse mode (R) selection position, and a second route, which extends from the H position to a drive mode (D) selection position. Neutral selection positions that cut the transmission of torque to the transmission are set as an N1 position in the first route and an N2 position in the second route. The N1 position, the H position, and the N2 position are set along a straight line.

SUMMARY

With regard to the shift lever of the shift device described in the above '212 patent, the inventors of the present invention have studied in detail the movement of the shift lever when the shift lever automatically returns to the H position from the R position or the D position. The shift lever moves beyond the H position due to inertia of the shift lever, and then moves in the opposite direction to return to the H position. The inventors have noticed that the shift lever vibrates about the H position, and the amplitude of the vibration attenuates gradually before being held at the H position. The inventors have noticed that the momentary type shift lever does not readily stop at the H position.

One aspect of the present invention is a shift device for a transmission. The shift device includes a shift lever and a momentary type lever unit including a home position and a plurality of mode selection positions. The momentary type lever unit automatically returns the shift lever to the home position. The shift lever is movable from the home position in two intersecting directions. The plurality of mode selection positions includes a reverse mode selection position set in a route extending in at least one of the two directions. The plurality of mode selection positions includes a drive mode selection position set in a route extending in at least the other one of the two directions.

A transmission mode selector according to one embodiment includes a selector lever and a momentary type lever unit. The momentary type lever unit includes a movement route including two terminal ends and first and second bent portions arranged between the two terminal ends, a home position set at the first bent portion of the movement route, a plurality of mode selection positions set at positions other than the first and second bent portions. The momentary type lever unit automatically returns the selector lever to the home position. The plurality of mode selection positions include a reverse mode selection position and a drive mode selection position respectively set at the two terminal ends of the movement route.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a schematic plan view showing a shift gate;

FIG. 3 is a schematic plan view showing a first modification of the shift gate;

FIG. 4 is a schematic plan view showing a second modification of the shift gate;

FIG. 5 is a schematic plan view showing a third modification of the shift gate; and FIG. 6 is a schematic plan view showing a fourth modification of the shift gate.

DETAILED DESCRIPTION OF EMBODIMENTS

Figure 1:
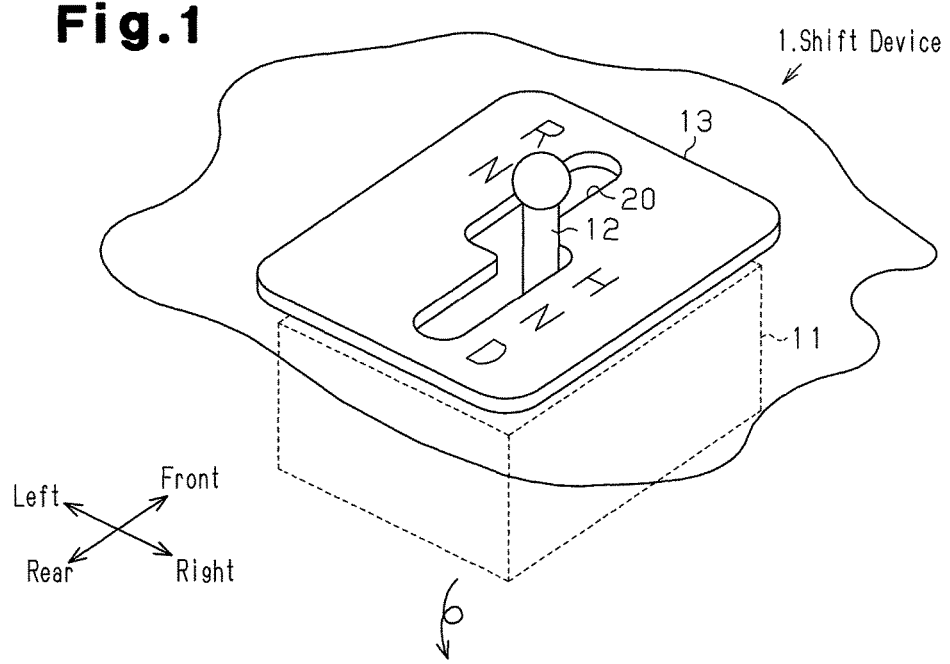
FIG. 1 is a perspective view of a shift device and a plan view of a shift gate.
Figure 1:
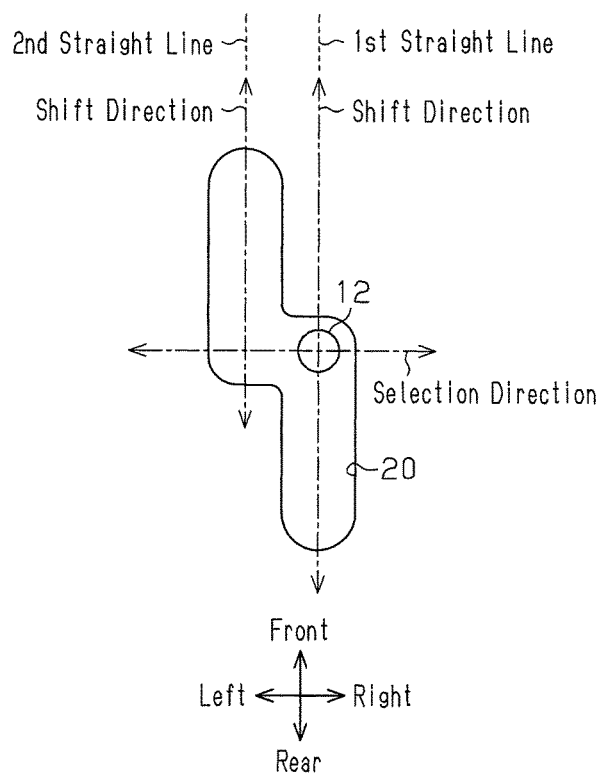

A shift device according to one embodiment of the present invention will now be described. A shift device 1 is arranged on, for example, a floor console located between a driver seat and a passenger seat. As shown in FIG. 1, the shift device 1 includes a shift lever 12 and a momentary type lever unit 11, which supports the shift lever 12. The shift device 1 may include a shift panel 13 through which the shift lever 12 extends. The shift panel 13 includes a shift gate 20 formed in correspondence with a movement route of the shift lever 12. The shift lever 12 is supported to be movable along the shift gate 20 in a shift direction, which extends in the forward to rearward direction of the vehicle, and a selection direction, which extends in the sideward direction of the vehicle. Movement of the shift lever 12 in the shift direction includes movement along a first straight line and movement along a second straight line, which is parallel to the first straight line. A home (H) position is set in the first straight line. A first N position and a D position are sequentially set from the H position toward the rear of the vehicle. The H position is set at a right bent portion. The shift gate 20 extends from the H position toward a left bent portion, which is from where a second N position and an R position are sequentially set toward the front of the vehicle. Each N position is a neutral mode (N) selection position for cutting the transmission of torque to the transmission. The D position is a drive mode (D) selection position. The R position is a reverse mode (R) selection position.

The momentary type lever unit 11 includes a shift lever movement route that conforms to the shape of the shift gate 20. In the illustrated example, the shift lever movement route includes two terminal ends and first and second bent portions arranged between the two terminal ends. The H position is set at the first bent portion of the shift lever movement route. The selection positions (R, N, N, and D) are set at locations other than the first and second bent portions. The shift lever movement route extends from the home position toward the two terminal ends along an L-shaped route and a straight route. In this manner, the shift lever movement route may be a two-terminal end bent route that is free from a three-way junction. In a number of examples, the selection positions include a neutral selection (N) position set between the H position and a terminal end. Further, in a number of examples, two neutral selection (N, N) positions are set spaced apart from each with the first and second bent portions located in between. A selection position does not have to be set at the second bent portion of the shift lever movement route.

The shift lever 12 is normally held at the H position by the momentary type lever unit 11, which includes a returning mechanism. A user moves the shift lever 12 from the H position in the shift direction or the selection position to select modes of the transmission. When the user releases the shift lever 12, the momentary type lever unit 11 automatically returns the shift lever 12 to the H position. The momentary type lever unit 11, which includes a position sensor, detects the position or movement of the shift lever 12 and provides a detection signal to a transmission controller. The transmission controller shifts modes of the transmission in accordance with the detection signal.

The operation of the shift device 1 will now be described.

As shown in FIG. 2, when the shift lever 12 is not being operated by the user, the shift lever 12 is held at the H position. Under this situation, when the user erroneously or unintentionally applies forward external force to the shift lever 12, a wall K1 forming the shift gate 20 in the shift panel 13 restricts movement of the shift lever 12 toward the front of the vehicle from the H position. When the shift lever 12 is arranged on the floor console, under a situation in which the user places his or her hand on the top of the shift lever 12, a force pushing the shift lever 12 toward the front from the H position is apt to be applied to the shift lever 12. However, the present example restricts unintentional movement of the shift lever 12 toward the front from the H position.

When the user selects the reverse mode (R), the user moves the shift lever 12 from the H position in the left direction (selection direction) and then moves the shift lever 12 along the second straight line in the front direction of the vehicle (shift direction) to the second N position and then the R position. When the duration time of the shift lever 12 at the second N position is greater than or equal to a threshold, the shift device 1 outputs a signal that shifts the transmission to a neutral mode (N). When the shift lever 12 is moved from the second N position to the R position, the shift device 1 outputs a signal that switches the transmission from the neutral mode (N) to the reverse mode (R).

When the user releases the shift lever 12 after selecting the reverse mode (R), the operation force applied to the shift lever 12 is cancelled. Thus, the shift device 1 automatically returns the shift lever 12 along the second straight line from the R position to the second N position and then to the H position. Due to inertia, the shift lever 12 is apt to moving beyond the H position in the right direction. However, the shift panel 13 includes a wall K2 that restricts inertial movement of the shift lever 12 in the right direction from the H position. Accordingly, the shift lever 12 readily stops at the H position.

When the user selects the drive mode (D), the user moves the shift lever 12 from the H position in the rear direction (shift direction) and then moves the shift lever 12 along the first straight line toward the rear of the vehicle (shift direction) to the first N position and then the D position. When the duration time of the shift lever 12 at the first N position is greater than or equal to a threshold, the shift device 1 outputs a signal that shifts the transmission to the neutral mode (N). When the shift lever 12 is moved from the first N position to the D position, the shift device 1 outputs a signal that switches the transmission from the neutral mode (N) to the drive mode (D).

When the user releases the shift lever 12 after selecting the drive mode (D), the operation force applied to the shift lever 12 is cancelled. Thus, the shift device 1 automatically returns the shift lever 12 along the first straight line from the D position to the first N position and then to the H position. Due to inertia, the shift lever 12 has a tendency of moving beyond the H position in the front direction. However, the shift panel 13 includes the wall K1 that restricts inertial movement of the shift lever 12 in the front direction from the H position. Accordingly, the shift lever 12 readily stops at the H position.

One example of the lever unit 11 includes a click mechanism that generates a click, or reaction force, at the two N positions, the R position, and the D position. The click mechanism includes ridges and valleys, which are formed in the movement route, and a pin, which is resiliently urged toward the movement route. The user feels a click when moving the shift lever 12 from the H position to the first N position or the second N position or when moving the shift lever 12 via an N position to the R position or the D position.

The present embodiment has the advantages described below.

(1) The shift lever 12 is movable from the H position in two intersecting directions, that is, a first direction (left direction) and a second direction (rear direction). The reverse mode (R) selection position is set in a route extending from the H position in at least the first direction (e.g., L-shaped route). The drive mode (D) selection position is set in a route extending in the second direction (e.g., straight route). When the user cancels the operation force applied to the shift lever 12 after selecting the reverse mode (R), the shift lever 12 moves to the H position. In this case, inertial movement of the shift lever 12 from the H position in the second direction, which intersects the first direction, is suppressed. In the same manner, when the user cancels the operation force applied to the shift lever 12 after selecting the drive mode (D), the shift lever 12 moves to the H position. In this case, inertial movement of the shift lever 12 from the H position in the first direction, which intersects the second direction, is suppressed. Inertial movement of the shift lever 12, which is automatically returned to the H position, beyond the H position in another direction is suppressed. Accordingly, the shift lever is readily stopped at the H position.

(2) The shift lever 12 is movable from the H position in two directions, which are orthogonal to each other. That is, the shift lever 12 is movable in the first direction (left direction) and the second direction (rear direction). Thus, when the shift lever 12 automatically returns to the H position, inertial movement beyond the H position and toward a different direction is suppressed. Accordingly, the shift lever 12 readily stops at the shift lever 12.

(3) The movement of the shift lever 12 from the home (H) position to just before the reverse mode (R) selection position and the movement of the shift lever 12 from the home (H) position to just before the drive mode (D) selection position both take place along the shift direction. This allows the user to operate the shift lever 12 without any confusion and thereby improves the operability. Further, the shift device 1 uses a sensor to detect movement of the shift lever 12 in the shift direction but does not necessarily require a sensor to detect movement of the shift lever 12 in the selection direction. Accordingly, the detection system of the shift lever may be simplified.

(4) The direction the shift lever 12 moves from the home (H) position to just before the reverse mode (R) selection position (forward direction) is opposite to the direction the shift lever 12 moves from the home (H) position to just before the drive mode (D) selection position. This obviates erroneous selection of the reverse mode (R) and the drive mode (D).

(5) When the shift lever 12 automatically returns to the H position from the R position or the D position, the walls K1 and K2 restrict inertial movement of the shift lever 12. Accordingly, the shift lever 12 readily stops at the H position.

(6) When the user selects the drive mode (D), the user moves the shift lever 12 from the H position only in the shift direction (toward the rear of the vehicle). When the user selects the reverse mode (R), the user first moves the shift lever 12 from the H position in the selection direction (left direction) and then changes the movement direction to the shift direction (front direction). The combined movement in the selection direction and the shift direction may clearly be distinguished from the movement in only the shift direction. Accordingly, erroneous operation of the shift lever 12 may be suppressed.

(7) When the user selects the reverse mode (R), the user first moves the shift lever 12 in the selection direction (left direction) from the H position and then changes the movement direction in the shift direction (forward direction). In this manner, the movement direction of the shift lever 12 is changed to select the reverse mode (R). This lowers the operation speed of the shift lever 12. Accordingly, the user may recognize the present position of the shift lever 12 without mistaking the D position as the R position or vice versa.

(8) The shift lever movement route may be a two-terminal end bent route that is free from a three-way junction. Accordingly, the operation of the shift lever 12 is simple and easy to understand.

It should be apparent to those skilled in the art that the present invention may be embodied in many other specific forms without departing from the spirit or scope of the invention. Particularly, it should be understood that the present invention may be embodied in the following forms.

The first N position or the second N position may be omitted. FIG. 3 shows an example in which the second N position is omitted from between the H position and the R position. In this case, the user moves the shift lever 12 from the H position to the first N position along the first straight line to select the neutral mode (N). The N position shown in FIG. 3 is the closest selection position from the H position among the plurality of selection positions. This improves the operability for the selection of neutral mode (N). FIG. 4 shows an example in which the first N position is omitted from between the H position and the D position. In this case, the user moves the shift lever 12 from the H position in the left direction (selection direction) and then moves the shift lever 12 in the front direction (shift direction) to move the shift lever 12 along the second straight line to the N position and select the neutral mode. When moving the shift lever 12 from the H position, the user changes the movement direction of the shift lever 12 before reaching the N position. This lowers the operation speed of the shift lever 12 when selecting the neutral mode, and the duration time of the shift lever 12 at the N position is apt to increase. Accordingly, the selection of the neutral mode may be ensured.

FIG. 5 shows an example in which the shift device 1 is arranged so that the shift gate 20 extends in a vertical direction of the vehicle. Thus, the two terminal ends of the shift gate 20 are an upper end and a lower end. This shift device 1 may be arranged, for example, on an instrument panel located in front of the driver seat. The shift direction of the shift lever 12 is the vertical direction of the vehicle, and the selection direction is the sideward direction of the vehicle. Movement of the shift lever 12 in the shift direction includes movement along a third straight line and movement along a fourth straight line, which is parallel to the third straight line. The third straight line includes the home (H) position. The first N position and the R position are sequentially set upward from the H position. The H position is set at a left bent position. From the H position, the second N position, and the D position are sequentially set below the right bent portion in the lower direction of the vehicle.

When the user is not operating the shift lever 12, the shift lever 12 is held at the H position. Under this situation, when the user erroneously or unintentionally applies downward external force to the shift lever 12, a wall K3 forming the shift gate 20 in the shift panel 13 restricts downward movement of the shift lever 12 from the H position. When the shift lever 12 is arranged on the instrument panel, under a situation in which the user places his or her hand on the top of the shift lever 12, a force pushing the shift lever 12 in the lower direction from the H position is apt to be applied to the shift lever 12. However, the present example restricts unintentional downward movement of the shift lever 12 from the H position.

When the user selects the reverse mode (R), the user moves the shift lever 12 from the H position in the upper direction (shift direction) and then further moves the shift lever 12 from the N position to the upper R position. When the duration time of the shift lever 12 at the N position is greater than or equal to a threshold, the shift device 1 outputs a signal that shifts the transmission to the neutral mode (N). When the shift lever 12 is moved from the N position to the R position, the shift device 1 outputs a signal that switches the transmission from the neutral mode (N) to the reverse mode (R).

When the user releases the shift lever 12 at the R position after selecting the reverse mode (R), the operation force applied to the shift lever 12 is cancelled. Thus, the shift device 1 automatically returns the shift lever 12 along the third straight line from the R position to the N position and then to the H position. Due to inertia, the shift lever 12 has a tendency to move beyond the H position in the lower direction. However, the shift panel 13 includes the wall K3 that restricts inertial movement of the shift lever 12 in the lower direction from the H position. Accordingly, the shift lever 12 readily stops at the H position.

When the user selects the drive mode (D), the user moves the shift lever 12 from the H position in the right direction (shift direction) and then moves the shift lever 12 along the fourth straight line in the lower direction to the N position and then the D position. When the duration time of the shift lever 12 at the N position is greater than or equal to a threshold, the shift device 1 outputs a signal that shifts the transmission to the neutral mode (N). When the shift lever 12 is moved from the N position to the D position, the shift device 1 outputs a signal that switches the transmission from the neutral mode (N) to the drive mode (D).

When the user releases the shift lever 12 after selecting the drive mode (D), the operation force applied to the shift lever 12 is cancelled. Thus, the shift device 1 automatically returns the shift lever 12 along the selection direction from the D position to the N position along the fourth straight line and then to the H position. Due to inertia, the shift lever 12 has a tendency to move beyond the H position toward the left. However, the shift panel 13 includes a wall K4 that restricts inertial movement of the shift lever 12 toward the left from the H position. Accordingly, the shift lever 12 readily stops at the H position.

The example of FIG. 5 has advantages (1) to (8) of the above embodiment.

One of the two N positions shown in FIG. 5 may be omitted. FIG. 6 shows an example in which an N position is omitted from between the H position and the D position. In this case, the user selects the neutral mode (N) selection position by moving the shift lever 12 from the H position along the third straight line to the N position. The N position shown in FIG. 6 is the closest selection position from the H position among the plurality of selection positions. This improves the operability for the selection of the neutral mode (N). Although not shown in the drawings, the N position between the H position and the R position in FIG. 5 may be omitted. In this case, in the same manner as FIG. 5, the user moves the shift lever 12 from the H position toward the right (selection direction) and then moves the shift lever 12 in the lower direction (shift direction) to move the shift lever 12 along the fourth straight line and thereby select the N position. In this example, when moving the shift lever 12 from the H position, the user changes the movement direction of the shift lever 12 between the H position and the N position on the fourth straight line. This lowers the operation speed of the shift lever 12 when selecting the neutral mode, and the duration time of the shift lever 12 at the N position is apt to increase. Accordingly, the selection of neutral may be ensured.

In the above embodiment and modified examples, the shift gate 20 may be shaped so that the left and right sides are reversed.

In the above embodiment and modified examples, the shift gate 20 may be shaped so as to be rotated in the clockwise or counterclockwise direction. For example, when rotating the shift gate 20 of FIG. 2 by 90 degrees in the counterclockwise direction, the shift direction is the sideward direction of the vehicle, and the selection direction is the front to rear direction of the vehicle. The rotation direction is not limited to 90 degrees, and the rotation direction is not limited to the counterclockwise direction.

The N position that is proximal to the R position and the N position that is proximal to the D position may both be omitted. In this case, in the same manner as a P switch for selection of a parking position, it is preferable that a dedicated N position selection switch be separately arranged.

The D position does not have to be set at a terminal end of a shift lever movement route. For example, a separate mode selection position (e.g., L position for low speed driving or B position for regenerative brake) may be set at positions located beyond the D position in the shift direction.

The angle of the shift direction and the selection direction at the H position is not restricted to a right angle. As long as the shift lever 12 is movable from the H position in two intersecting directions, the angle between the shift direction and the selection direction may be acute or obtuse.

In the example of FIG. 2, the home (H) position, the N position, and the D position are set along the first straight line. In this example, as the movement distance of the shift lever 12 increases from the H position, the lever unit 11 may produce a heavier operation load that is received by the user. In this case, the user may recognize the movement distance of the shift lever 12 based on the forced used to move the shift lever 12.

In the example of FIG. 2, the distance between the H position and the left bent portion, that is, the distance between the first straight line and the second straight line may be changed in accordance with control logic of the shift device 1, the location of the wall K1, or the like.

As described above, in the examples of FIGS. 2 to 4, the shift device 1 is preferably arranged on the floor console. In the examples of FIGS. 5 and 6, the shift device 1 is preferably arranged on the instrument panel. Instead, the shift device 1 of FIGS. 2 to 4 may each be arranged on the instrument panel, and the shift device 1 of each of FIGS. 5 and 6 may be arranged on the floor console.

The present examples and embodiments are to be considered as illustrative and not restrictive, and the invention is not to be limited to the details given herein, but may be modified within the scope and equivalence of the appended claims.

The invention claimed is:

1. A shift device for a transmission, the shift device comprising:
   a shift lever movable along a movement route;
   a momentary type lever unit including a home position and a plurality of mode selection positions in the movement route, the plurality of mode selection positions including a reverse mode selection position in which a reverse mode of the transmission is selected and a drive mode selection position in which a drive mode of the transmission is selected, wherein the momentary type lever unit automatically returns the shift lever from the reverse mode selection position to the home position along the movement route upon release of the shift lever after selecting the reverse mode and automatically returns the shift lever from the drive mode selection position to the home position along the movement route upon release of the shift lever after selecting the drive mode, wherein
   the shift lever is movable from the home position in two intersecting directions,
   the reverse mode selection position is set in a route extending in at least one of the two directions,
   the drive mode selection position is set in a route extending in at least the other one of the two directions, and
   the movement route is a two-terminal end bent route that is free from a three-way junction and includes an L-shaped route and a straight route respectively extending from the home position to the two terminal ends, the home position is set at a corner of the movement route, and the plurality of mode selection positions includes at least one neutral mode selection position that is set at a non-terminal end that is at an intermediate position in the straight route and/or at a non-terminal end that is at an intermediate position in a straight section of the L-shaped route;
      wherein the shift lever is movable in a straight first shift direction including the home position,
      a straight second shift direction free from the home position and parallel to the first shift direction, and
      a straight selection direction including the home position and intersecting the first and second shift directions;
      the shift lever is moved from the home position to just before the reverse mode selection position along one of the first and second shift directions; and the shift lever is moved from the home position to just before the drive mode selection position along the other one of the first and second shift directions.

2. The shift device according to claim 1, wherein the two directions are orthogonal to each other.

3. The shift device according claim 1, wherein the shift lever moves to just before the reverse mode selection position in a direction opposite to a direction in which the shift lever moves to just before the drive mode selection position.

4. The shift device according to claim 1, when the shift lever automatically returns to the home position from the reverse mode selection position or the drive mode selection position, a wall restricts movement of the shift lever beyond the home position.

5. A transmission mode selector for a transmission, comprising:
- a selector lever;
- a momentary type lever unit including
  - a movement route which is a two-terminal end bent route that is free from a three-way junction and includes two terminal ends and first and second L-shaped bent portions arranged between the two terminal ends, the first and second L-shaped bent portions each including a corner,
  - a home position set at the corner of the first L-shaped bent portion of the movement route, and
  - a plurality of mode selection positions set at positions other than the corners of the first and second L-shaped bent portions, the plurality of mode selection positions including a reverse mode selection position in which a reverse mode of the transmission is selected and a drive mode selection position in which a drive mode of the transmission is selected, and
- wherein the momentary type lever unit automatically returns the selector lever from the reverse mode selection position to the home position along the movement route upon release of the selector lever after selecting the reverse mode and automatically returns the selector lever from the drive mode selection position to the home position along the movement route upon release of the selector lever after selecting the drive mode, and the reverse mode selection position and the drive mode selection position are respectively set at the two terminal ends of the movement route, and
- the plurality of mode selection positions includes at least one neutral mode selection position set at a non-terminal end that is at an intermediate position in a straight section of the movement route;
- wherein the selector lever is movable in a straight first shift direction including the home position,
  - a straight second shift direction free from the home position and parallel to the first shift direction, and
  - a straight selection direction including the home position and intersecting the first and second shift directions;
- the selector lever is moved from the home position to just before the reverse mode selection position along one of the first and second shift directions; and
- the selector lever is moved from the home position to just before the drive mode selection position along the other one of the first and second shift directions.

6. The transmission mode selector according to claim 5, wherein the corner of the second L-shaped bent portion of the movement route is located between the home position, which is set at the corner of the first L-shaped bent portion, and the reverse mode selection position.

7. The transmission mode selector according to claim 5, wherein the corner of the second L-shaped bent portion of the movement route is located between the home position, which is set at the corner of the first L-shaped bent portion, and the drive mode selection position.

8. The transmission mode selector according to claim 5, wherein the at least one neutral mode selection position is set between the home position and one of the two terminal ends.

9. The shift device according to claim 1, wherein the at least one neutral mode selection position is next to the home position.

10. The transmission mode selector according to claim 5, wherein the at least one neutral mode selection position is next to the home position.

* * * * *